United States Patent [19]

Hager

[11] Patent Number: 5,305,774
[45] Date of Patent: Apr. 26, 1994

[54] TRUCK BED CANOPY MOUNT

[76] Inventor: Charles T. Hager, 124 Pine St., Frostburg, Md. 21532

[21] Appl. No.: 973,660

[22] Filed: Nov. 9, 1992

[51] Int. Cl.⁵ .............................................. B60P 7/00
[52] U.S. Cl. ...................................... 135/88; 296/156; 296/100
[58] Field of Search ................. 135/88; 296/100, 156; 52/716.5; 16/87.6 R, 87.8; 160/346, 347

[56] References Cited

U.S. PATENT DOCUMENTS

| | | | |
|---|---|---|---|
| 3,773,380 | 11/1973 | Stockdill | 296/100 |
| 4,242,977 | 1/1981 | Long | 114/210 |
| 4,397,497 | 8/1983 | Alonzo, Jr. et al. | 296/26 |
| 4,648,649 | 3/1987 | Beal | 296/100 X |
| 4,693,508 | 9/1987 | Pettit | 296/100 |
| 4,721,336 | 1/1988 | Jones | 296/100 |
| 5,052,739 | 10/1991 | Irwin | 296/100 |
| 5,192,107 | 3/1993 | Smith | 293/3 |

Primary Examiner—Carl D. Friedman
Assistant Examiner—Robert J. Canfield
Attorney, Agent, or Firm—Leon Gilden

[57] ABSTRACT

A truck bed canopy is arranged to include a plurality of parallel slide rails arranged for sliding reception within side wall rail members mounted to upper top walls of vehicular truck bed side walls. A lock pin is directed through the slide rail and associated companion side wall rail member to selectively secure the components together permitting ease of assembly and disassembly of the associated truck bed canopy relative to the truck bed.

1 Claim, 4 Drawing Sheets

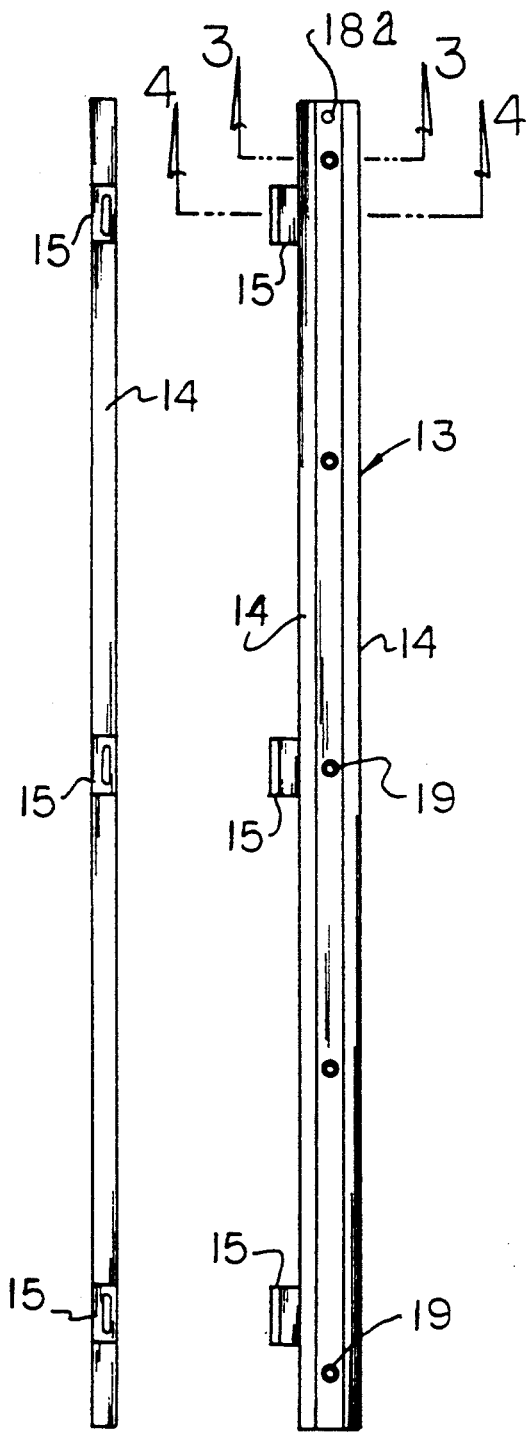
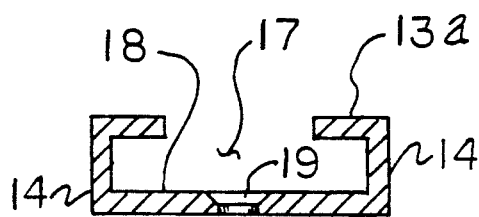
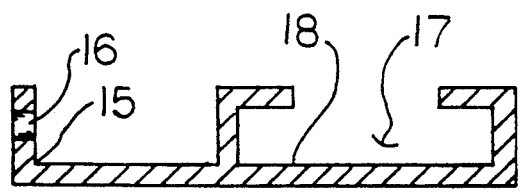

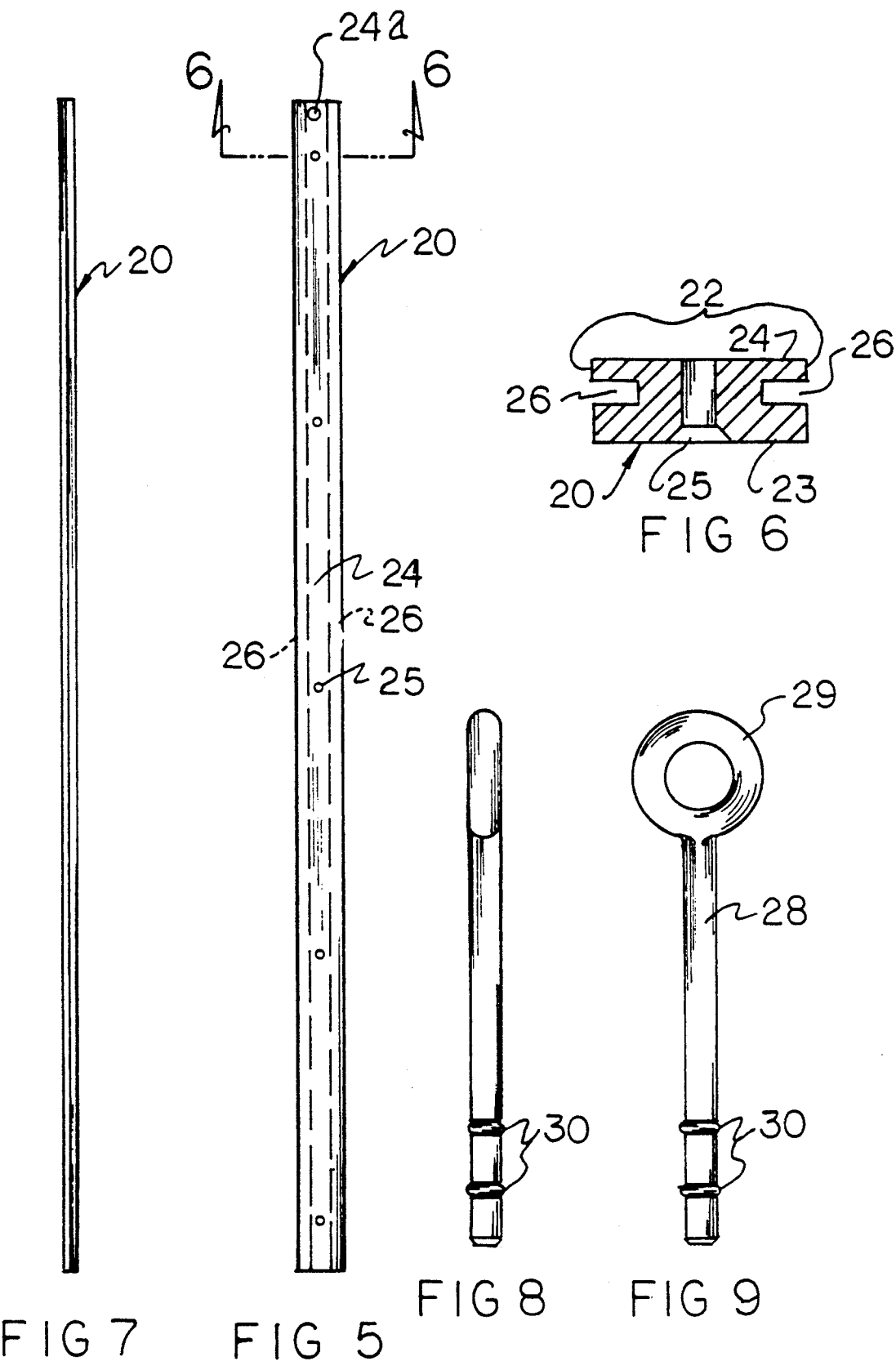

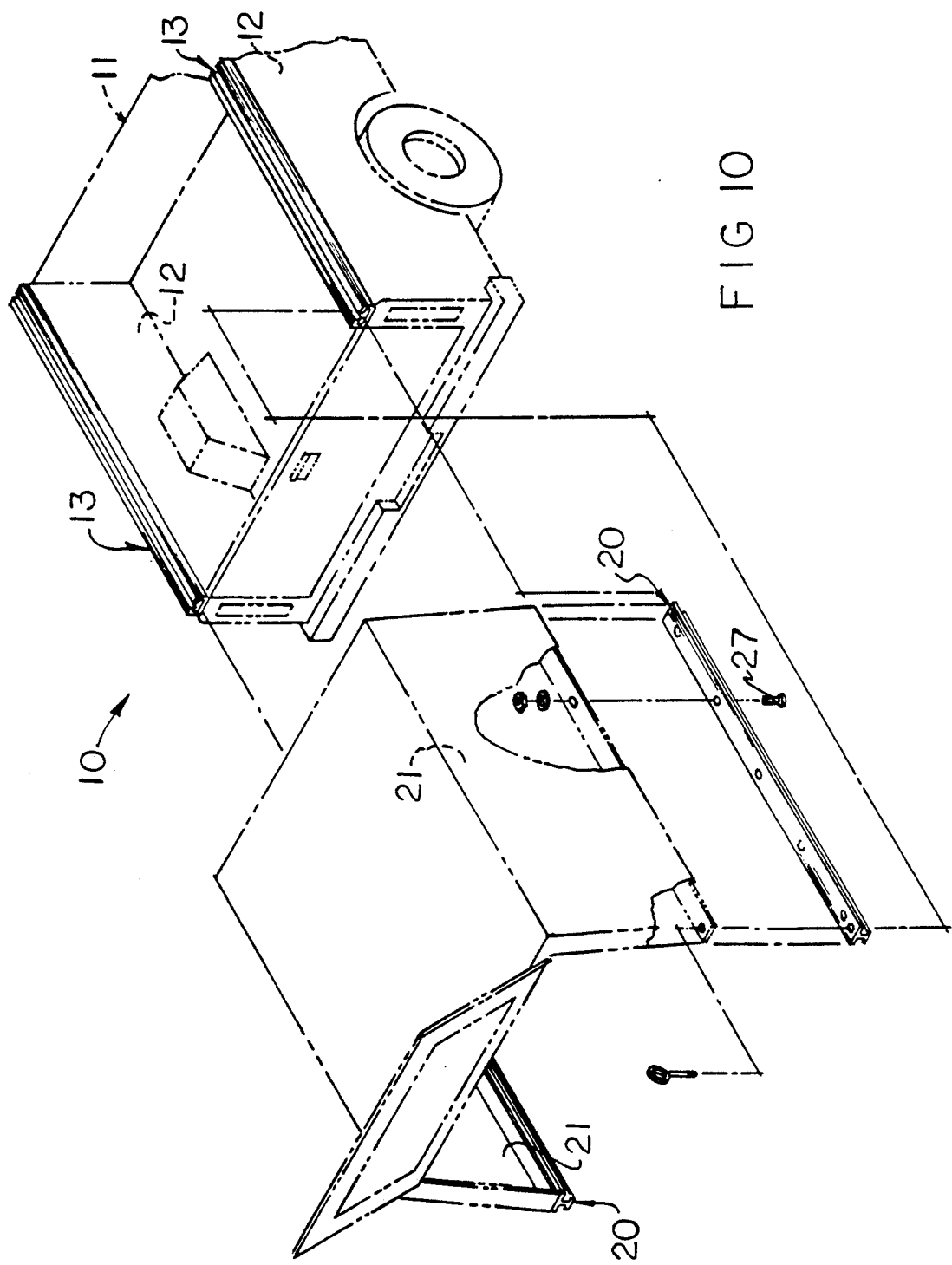

TRUCK BED CANOPY MOUNT

BACKGROUND OF THE INVENTION

1. Field of the Invention

The field of invention relates to canopy mounting structure, and more particularly pertains to a new and improved truck bed canopy mount wherein the same is arranged for the ease of mounting and dismounting of a truck bed canopy relative to an associated truck bed.

2. Description of the Prior Art

The use of accessory structure to mount truck bed accessories thereto are utilized in the prior art and exemplified in U.S. Pat. Nos. 4,650,382 and 4,936,724 wherein a truck bed employs various projections thereon to secure various cargo within an associated truck bed.

U.S. Pat. No. 4,958,875 to Zamzow sets forth structure to be received within truck bed side wall pockets to permit securement of a framework within the pockets to permit the subsequent protecting of rail structure relative to an associated truck bed.

The instant invention attempt to overcome deficiencies of the prior art by providing for a truck bed canopy mount structure addressing both the problems of ease of use as well as effectiveness in construction permitting the ease of mounting and dismounting of a truck bed canopy relative to an associated truck bed and in this respect, the present invention substantially fulfills this need.

SUMMARY OF THE INVENTION

In view of the foregoing disadvantages inherent in the known types of truck bed canopy mounting structure now present in the prior art, the present invention provides a truck bed canopy mount wherein the same is arranged to provide for sliding interconnection of a truck bed canopy relative to the side walls of an associated truck bed for the ease of assembly and disassembly of a truck bed canopy relative to the associated truck bed. As such, the general purpose of the present invention, which will be described subsequently in greater detail, is to provide a new and improved truck bed canopy mount 7hich has all the advantages of the prior art truck bed canopy mounting structure and none of the disadvantages.

To attain this, the present invention provides a truck bed canopy arranged to include a plurality of parallel slide rails arranged for sliding reception within side wall rail members mounted to upper top walls of vehicular truck bed side walls. A lock pin is directed through the slide rail and associated companion side wall rail member to selectively secure the components together permitting ease of assembly and disassembly of the associated truck bed canopy relative to the truck bed.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved truck bed canopy mount which has all the advantages of the prior art truck bed canopy mounting structure and none of the disadvantages.

It is another object of the present invention to provide a new and improved truck bed canopy mount which may be easily and efficiently manufactured and marketed.

It is a further object of the present invention to provide a new and improved truck bed canopy mount which is of a durable and reliable construction.

An even further object of the present invention is to provide a new and improved truck bed canopy mount which is susceptible of a low cost of manufacture with regard to both materials and labor, and which accordingly is then susceptible of low prices of sale to the consuming public, thereby making such truck bed canopy mounts economically available to the buying public.

Still yet another object of the present invention is to provide a new and improved truck bed canopy mount which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an orthographic side view of a side wall member for use by the invention.

FIG. 2 is an orthographic top view of the side wall rail members as indicated in FIG. 1.

FIG. 3 is an orthographic view, taken along the lines 3—3 of FIG. 2 in the direction indicated by the arrows.

FIG. 4 is an orthographic view, taken along the lines 4—4 of FIG. 2 in the direction indicated by the arrows.

FIG. 5 is an orthographic top view of a slide rail for use by the canopy of an associated truck bed.

FIG. 6 is an orthographic view, taken along the lines 6—6 of FIG. 5 in the direction indicated by the arrows.

FIG. 7 is an orthographic side view of the slide rail structure as set forth in FIG. 5.

FIG. 8 is an orthographic side view of a lock pin for use by the invention.

FIG. 9 is an orthographic frontal view of the lock pin structure.

FIG. 10 is an isometric illustration of the organization for use in an associated truck bed.

DESCRIPTION OF THE PREFERRED EMBODIMENT

Figure 11:
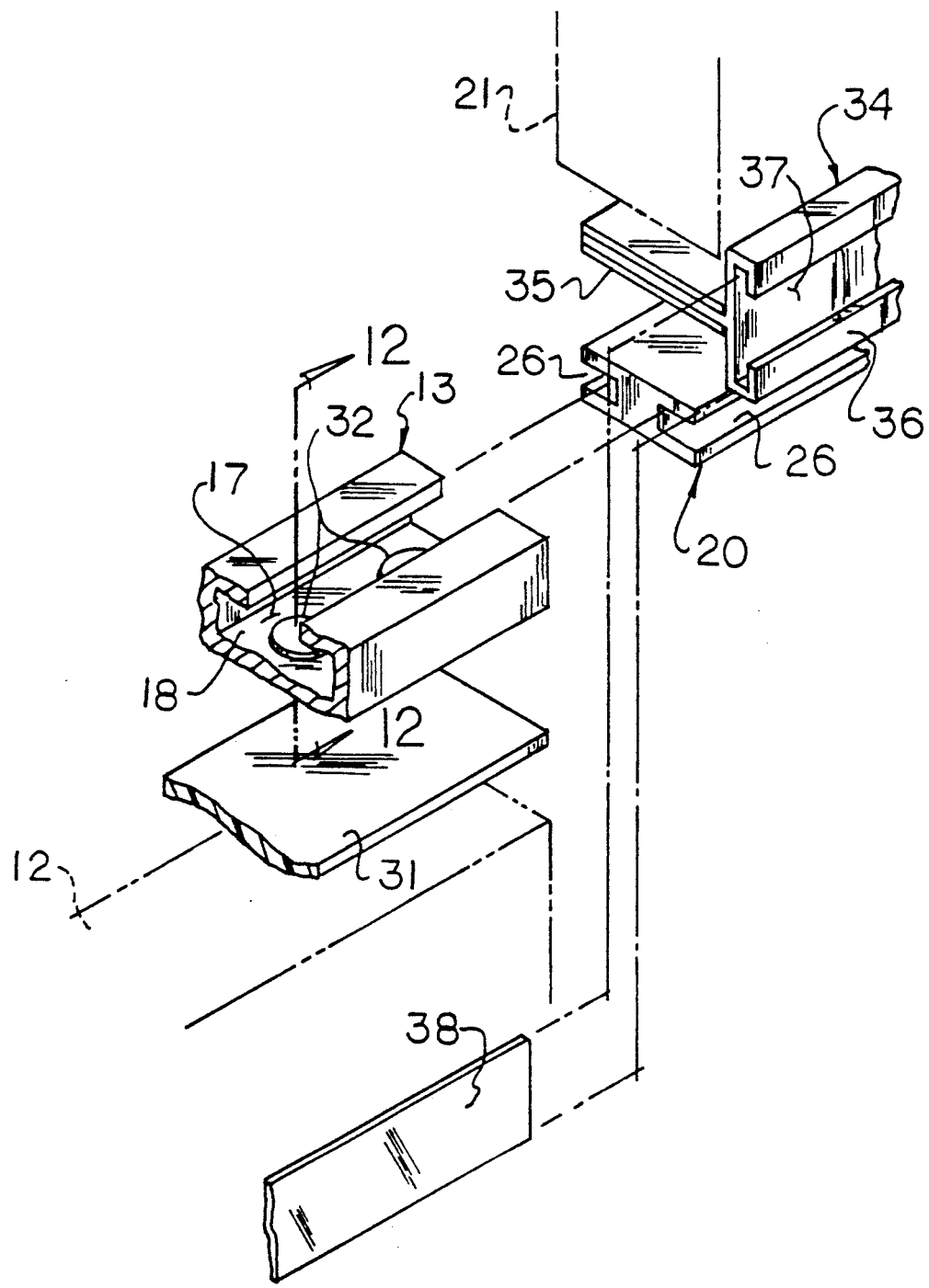
FIG. 11 is an enlarged isometric illustration of the invention further employing a trim plate structure.

With reference now to the drawings, and in particular to FIGS. 1 to 12 thereof, a new and improved truck bed canopy mount embodying the principles and concepts of the present invention and generally designated by the reference numeral 10 will be described.

More specifically, the truck bed canopy mount 10 of the instant invention essentially comprises the association with a vehicle, having a vehicular truck bed 11, as indicated in FIG. 10, with the truck bed including truck bed side walls 12. Each truck bed side wall includes an upper top wall surface, wherein each top wall surface has a side wall rail member 13 fixedly secured thereto substantially coextensive with each truck bed side wall 12. The side wall rail members 13 have rail member side walls 14 (see FIG. 3), wherein the side wall rail members further include a side wall rail top wall, with a T-shaped channel 17 coextensive with each side wall rail member 13 and directed through the side wall rail top wall 13a, as indicated in FIGS. 2 and 3 for example. A plurality of L-shaped flanges 15 are fixedly mounted to one of the side walls 14, wherein each L-shaped flange 15 includes a flange slot 16 therein. In this manner, upon separation of the canopy structure of the type as indicated in FIG. 10, the remaining side wall rail members 13 mounted to the truck bed side walls 12 provide for convenient support loops for securing cargo within the associated truck bed. The T-shaped channel 17 has a channel floor 18, with a plurality of floor apertures 19 directed therethrough. In this manner, fasteners are arranged for projection through the floor apertures 19 into the truck bed side walls for ease of fastening of each side wall rail member 13 to the associated truck bed side wall. Further, at least one floor lock bore 18a is directed through the channel floor 18 in addition to the floor apertures 19.

The canopy structure of the assembly includes canopy side walls 21, with each lower end face of each canopy cover side wall 21 having a slide rail 20 mounted thereto utilizing fasteners such as fasteners 27, as indicated in FIG. 10. The slide rails include rail side walls 22, a slide rail bottom wall 23, and a slide rail top wall 24. Mounting bores 25 are directed through the slide rails 20 extending from the slide rail bottom wall 23 through the slide rail top wall 24. Side wall slots 26 coextensive with each rail side wall 22 are arranged in a colinear relationship relative to one another, as well as in a parallel arrangement, as the side wall slots 26 permit projection of the slide rail between the slots 26 and the slide rail bottom wall 23 for reception within one of the T-shaped channels 27. A top wall lock bore 24a is arranged coextensive through the bottom wall 23 and the top wall 24 for coaxial alignment with a floor lock bore 18a. In this manner, a lock pin 28a is directed through the floor lock bore 18a in association with the top wall lock bore 24a. The lock pin 28 includes a lock pin head 29 (see FIG. 8), with the lock pin body having a plurality of resilient sealing rings 30, with one sealing ring arranged for reception within an associated floor lock bore 18a and top wall lock bore 24a to provide for securement of each associated lock pin to secure a pair of lock members to include the side wall rail member 13 and the slide rail 20 together.

The FIG. 11 indicates the further use if desired of a sealing strip 31 interposed between the side wall top wall and an associated side wall rail member 13 to minimize abrasion relative to the truck bed side wall top wall surface and to minimize squeaking and the like relative to the assembly.

Further the organization sets forth in FIG. 11 the optional use of a trim plate structure 34 having a first flange 35 interposed and secured between one slide rail 20, the top wall 24, and the lower end face of the canopy side wall 21. A second flange 36 orthogonally mounted relative to the first flange 35 has a second flange track 37 to receive a trim plate 38 therewithin.

Figure 12:
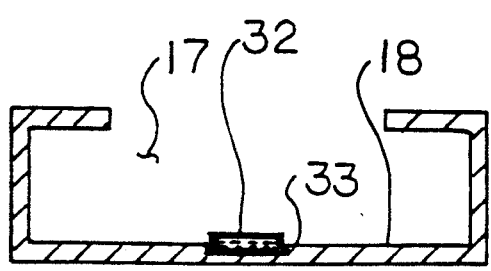
FIG. 12 is an orthographic view, taken along the lines 12—12 of FIG. 11 in the direction indicated by the arrows.

The FIG. 12 indicates the optional use of a plurality of pad recesses 33 mounted at spaced intervals along the channel floor 18 of the side wall rail member 13. Each pad recess 33 includes a fibrous lubricant impregnated pad 32 arranged to provide lubricity between sliding interengagement of the slide rail bottom wall 23 and the channel floor 18 during assembly and disassembly of the canopy relative to the vehicular truck bed.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A truck bed canopy mount arrangement for mounting to a vehicle having a truck bed, wherein the truck bed includes truck bed side walls, and each side wall includes an upper top wall surface, and a canopy, wherein the canopy includes canopy side walls, and each canopy side wall includes a lower end face, wherein the arrangement comprises,

- a plurality of side wall rail members, each side wall rail member arranged for mounting to one of said upper top wall surfaces, and each side wall rail member including a side rail top wall spaced from a side wall rail bottom wall, and spaced side wall rail side walls, and
- a T-shaped channel directed into each side wall rail member through the side wall rail top wall, and each T-shaped channel includes a channel floor, and each channel floor includes a plurality of floor apertures directed therethrough, with each floor aperture arranged for receiving a fastener for mounting the side wall rail member to an upper top wall surface, and
- a plurality of slide rails, each slide rail arranged for mounting to a lower end face of a canopy side wall, and each slide rail having a slide rail bottom wall spaced from a slide rail top wall, and spaced slide rail walls, each side wall includes a side wall slot coextensive with each side wall, and the slots are coextensive relative to one another and arranged in a colinear relationship, wherein each slide rail is received within one of the T-shaped channels between the slots and the slide rail bottom wall, and
- each slide rail having a plurality of mounting bores, with each mounting bore arranged to receive a further fastener to secure a slide rail to one of the canopy side walls, and
- each channel floor includes a lock aperture directed therethrough, and each slide rail includes a lock bore, wherein each lock bore is aligned with one of said lock apertures to define a lock bore pair, and a plurality of lock pins, each lock pin having a lock pin body, and each lock bore pair is arranged to receive a lock pin therethrough, with each lock pin having a plurality of resilient sealing rings, with one of the sealing rings positioned within said lock bore, and a further one of said sealing rings positioned within the lock aperture of the lock bore pair, and
- each channel floor includes a plurality of fibrous lubricant impregnated pads to provide for lubricity between the channel floor and the slide rail bottom wall, and each impregnated pad is received within a pad recess directed into a channel floor, and
- a trim plate assembly mounted to each slide rail top wall, and each trim plate assembly having a first flange mounted to a slide rail top wall, and a second flange orthogonally and fixedly mounted to the first flange, and the second flange having a second flange track, and a trim plate slidably received within the track.

* * * * *